United States Patent [19]

Ng

[11] Patent Number: 5,112,662

[45] Date of Patent: May 12, 1992

[54] METHOD FOR PROVIDING A LUBRICANT COATING ON THE SURFACE OF A MAGNETO-OPTICAL DISK AND RESULTING OPTICAL DISK

[75] Inventor: Quock Y. Ng, Scottsdale, Ariz.

[73] Assignee: Digital Equipment Corporation, Maynard, Mass.

[21] Appl. No.: 772,476

[22] Filed: Oct. 7, 1991

[51] Int. Cl.$^5$ ................................................. B32B 3/02
[52] U.S. Cl. ..................................... 428/64; 427/130; 427/131; 427/162; 427/430.1; 428/695; 428/900
[58] Field of Search .................... 428/64, 695, 900; 427/130, 131, 162, 430.1

[56] References Cited

U.S. PATENT DOCUMENTS 4,188,434  2/1980  Loran ..................................... 428/65

Primary Examiner—Bernard Pianalto
Attorney, Agent, or Firm—Hamilton, Brook, Smith & Reynolds

[57] ABSTRACT

A method for providing a lubricant coating on the surface of a magneto-optical disk is disclosed. The method includes forming a lubricant solution by dissolving a functionalized fluorinated lubricant compound in a solvent, the compound containing at least one fluorinated alkyl chain, and a functional group selected from an alcohol group (OH), carboxyl group (COOH) and phosphate group ($PO_4$). The lubricant compound has a melting point above the ambient operating temperature of said magneto-optical disk and below about 85° C. and a viscosity in the range of about one hundred to about one thousand centipoises in the temperature range of about 60° to about 85° C. The surface of the magneto-optical disk is coated with the lubricant solution, and the solvent is evaporated to produce a lubricant coating on the surface of a magneto-optical disk.

11 Claims, No Drawings

METHOD FOR PROVIDING A LUBRICANT COATING ON THE SURFACE OF A MAGNETO-OPTICAL DISK AND RESULTING OPTICAL DISK

BACKGROUND OF THE INVENTION

A magneto-optical recording disk stores information on a thin film of magneto-optical material. This magneto-optical material is disposed between two protective layers. The protective layers are disposed so that the magneto-optical material is enclosed to protect it against corrosion. Surrounding the protective layers are the substrate layers which are typically made of glass or polymer to protect the disk against scratching or other surface damage. The surfaces of the substrate layers are scored with grooves at a substantially uniform depth of less than about a micron and spaced concentrically at intervals on the order of about one or two microns. A disk read/write head, which is positioned closely above the surface of the disk, emits a laser beam. Using this beam, the head tracks the grooves at a high speed and high accuracy while reading and writing data on the magneto-optical material.

For magneto-optical disks which have read/write heads that come in contact with the disk surface, lubricants are typically disposed on the surface of the disk to protect the disk head and disk surface from damage. These lubricants reduce friction between the disk head and disk surface, and they enhance the wear resistance of the disk surface and of the head.

Organic lubricants, such as fatty acid esters and perfluoropolyesters, have been used as lubricants on magnetic media. However, these lubricants, when applied by current methods, do not work well on magneto-optical disks. Organic lubricants suitable for magnetic disks, when disposed on magneto-optical disks, can accumulate in the grooves. This accumulated lubricant can interfere with the laser beam by causing a low signal to noise ratio while the disk head is reading and writing on a disk. If the lubricant is a liquid, capillary action can occur upon contact between the lubricant on the disk surface and the disk head at a low rate of spin of the disk. Additionally, degradation of the lubricants over time leads to buildup of sludged material. Further, liquid lubricant is depleted from sections of the surface as a result of migration over the surface of the substrate from centrifugal forces.

Thus, a need exists for a method for providing a lubricant on magneto-optical media in a manner which overcomes or minimizes the above mentioned problems.

SUMMARY OF THE INVENTION

A method for providing a uniform lubricant coating on the surface of a magneto-optical disk includes the steps of forming a lubricant solution by dissolving a functionalized fluorinated lubricant compound in a solvent. The compound contains at least one fluorinated alkyl chain, a functional group selected from an alcohol (OH), a carboxyl (COOH) and a phosphate (PO$_4$). The lubricant has a melting point above the ambient operating temperature of said magneto-optical disk and below about 85° C. The viscosity is in the range between about one hundred to about one thousand centipoises in the temperature range of about 60° to about 85° C. The surface of the magneto-optical disk is coated with the lubricant solution, and the solvent is evaporated to produce a uniform lubricant coating on the surface of a magneto-optical disk.

This invention has many advantages. The phase change of the lubricant, with a melting point above the ambient operating temperature, allows the lubricant to remain a solid while at low sliding velocities, thereby minimizing capillary action of the lubricant between the substrate surface and the disk read/write head. At high sliding velocities, the lubricant absorbs the frictional heat from the contact between the disk surface and disk head to become a liquid. The lubricant coating is sufficiently transparent that it does not significantly interfere with the reading and writing on the disk by the beam. The lubricant sufficiently bonds to the surface to minimize migration over the substrate surface due to centrifugal forces.

DETAILED DESCRIPTION OF THE INVENTION

Suitable functionalized fluorinated lubricant compounds includes molecules with at least one chain which includes a series of CF$_2$ and CH$_2$ groups. The number of CF$_2$ groups in the chain is sufficient to provide lubrication to the disk surface. In one embodiment, the number of chains is three. The number of CF$_2$ groups in each chain is greater than about eight. In a particularly preferred embodiment, fluorinated alkyl chain lengths of the CF$_2$ group are eight, ten and twelve. Preferably, the CF$_2$ groups are at the end of the chain with a CF$_3$ group at the terminal end.

A number of CH$_2$ groups can be present in the compound to provide sufficient lubrication to the disk surface when combined with the CF$_2$ groups. In one embodiment, the range of CH$_2$ groups is between about zero and about three. In a particularly preferred embodiment, the number of CH$_2$ groups is two.

The molecular chains are flexible and give significant surface coverage and can withstand high shear rate contacts. Also, the molecular chains facilitate the dissipation of mechanical energy through bond rotation, translation and vibration, as well as coiling and uncoiling motions. The fluorinated hydrocarbon molecular chains provide thermal and oxidative stability for lubricants of magneto-optical disks.

Typically, the fluorinated chains of the lubricants have a distributed range of lengths. As an example, tris-perfluoroalkylcitrate is a suitable lubricant which is commercially available under the trademark of Zonyl TBC from E.I. du Pont de Nemours & Co. (du Pont). The perfluoroalkyls are present in the molecule as a distribution of chain lengths. The distribution of the chain lengths is present in a typical composition as follows: a four carbon chain in about three percent of the chains, a six carbon chain in about thirty-four percent of the chains, an eight carbon chain in about thirty percent of the chains, a ten carbon chain in about fifteen percent of the chains, a twelve carbon chain in about seven percent of the chains, a fourteen carbon chain in about five percent of the chains, a sixteen carbon chain in about three percent of the chains, an eighteen carbon chain in about two percent of the chains, and a twenty carbon chain in about one percent of the chains.

The fluorinated lubricant compounds include at least one functional group at one terminal end of a molecular chain. The functional group bonds the lubricant molecule to the surface of the disk substrate, thereby preventing the lubricant from being displaced during the disk read/write head contact and during spinning at high velocity. Examples of suitable functional group include an alcohol (OH), a carboxyl (COOH) and a phosphate ($PO_4$). The functional groups can be attached to a fluorinated lubricant compound. In one embodiment, the lubricant is a perfluoroalkyl alcohol, which has a functional alcohol group which bonds to the surface of the substrate. The attached fluorinated hydrocarbon chain has between about six and about twenty groups of $CF_2$ and about two groups of $CH_2$.

Specific examples of fluorinated hydrocarbons that can be used as lubricant compounds according to this invention include tris-perfluoroalkylcitrate, perfluoroalkyl stearate, perfluoroalkyl alcohol and perfluoroalkyl phosphate. Some of these are commercially available under the Zonyl trademark from du Pont.

Multiple fluorinated alkyl chains can be attached to a base molecule that contains a polar functional group. Increasing the number of chains in a molecule increases the ability to absorb the energy released from a contact between the disk head and surface of the disk. In a particularly preferred embodiment, the base molecule is a citrate where the fluorinated hydrocarbon chains are attached at the carboxyl groups and the functional alcohol group on the citrate bonds to the surface of the substrate.

The melting point of a lubricant should be above the ambient operating temperature of the magneto-optical disk drive. Typically, the ambient operating temperature of magneto-optical disks is about 50° C. Preferably, the lubricant has a melting point in the range of between about 60° and about 85° C. While at a low spinning velocity, the lubricant is a solid thus minimizing stiction due to capillary action of liquid lubricants between the disk surface and the disk read/write head. As the sliding velocity of the disk increases, the solid lubricant melts from the frictional heat and acts as a liquid lubricant. Mechanical stress is dissipated through the phase transformation of the lubricant from a solid to a liquid.

The viscosity of the liquid lubricant should be sufficient to minimize capillary action of the lubricant between the surface of the substrate and the disk head. A suitable viscosity is in the range of about one hundred to about one thousand centipoises for the temperature range of about 60° to about 85° C.

Mixtures of lubricants according to this invention can be used on the surface of the disk substrate. For example, a mixture of fifty percent by weight tris-perfluoroalkylcitrate and fifty percent perfluoroalkyl alcohol is suitable.

Preferably, the surface of the disk substrate is free of impurities so that good bonding can occur between the functional group of the lubricant to the substrate. Thus, the bonding of the lubricant to the surface of the disk can be enhanced by cleaning the surface with a mild oxygen plasma or an isopropanol vapor rinse prior to applying the lubricant. In one embodiment, the mild oxygen plasma is applied by a Tegal Model 515 reactor, commercially available from Tegal, Corp., at twenty-five Watts for fifteen seconds with two percent oxygen in argon.

The lubricant compound is dissolved in a solvent. The solvent should have a vapor pressure that is sufficiently low to readily evaporate at ambient temperature and pressure. Examples of solvents which are suitable include perfluoralkanes and oligomeric perfluoropolyethers. In a particularly preferred embodiment, the solvent is perfluoroheptane.

To apply the lubricant, the disk is completely submerged in the lubricant solution for a time to sufficiently contact the surface. In one embodiment, the disk is submerged for several seconds.

The angle of the disk to the surface of the solution is at an angle to sufficiently allow the excess solution to drain. In a particularly preferred embodiment, the angle is about ninety degrees.

The solution is drained from around the disk at a dip-coating gravity-drain rate which allows the solution to coat the disk. In one embodiment, the rate is about ninety millimeters per minute.

The solvent is significantly evaporated at a suitable temperature and pressure from the surface of the substrate. In one embodiment, the solvent is perfluoroheptane and is evaporated at a temperature of about 25° C. and a pressure of about one atmosphere.

The invention will now be further and more specially described by the following example. All parts and percentages are by weight unless otherwise specified.

EXAMPLE

In one liter of isopropanol, 2.5 grams of tris-perfluoroalkylcitrate, Zonyl TBC, were dissolved at 40° C. while stirring. The solution was allowed to cool to room temperature, whereupon recrystallization occurred. The isopropanol was filtered to separate the tris-perfluoroalkylcitrate. The recrystallized tris-perfluoroalkylcitrate white powder was dissolved at ambient temperature in 3.5 liters of perfluoroheptane (FC72 from 3M Corp.).

A 5.25 inch magneto-optical disk was employed. It had a glass substrate with a series of surface grooves about 800 angstroms deep and about 1.6 microns apart. The disk was completely submerged in the tris-perfluoroalkylcitrate solution for five seconds with the disk at a ninety degree angle to the surface of the solution. The solution was drained from around the disk at a dip-coating gravity-drain rate of ninety millimeters per minute to sufficiently coat the grooves and polymer substrate.

The dip-coated disk exhibited a surface stiction and friction of less than a 0.1 coefficient of friction (COF) after 10,000 revolutions at a fifteen inch-per-second rotational velocity.

EQUIVALENTS

Those skilled in the art will recognize, or be able to ascertain using no more than routine experimentation, many equivalents to the specific embodiments of the invention described specifically herein. Such equivalents are intended to be encompassed in the scope of the claims.

I claims:

1. A method for providing a lubricant coating on the surface of a magneto-optical disk, comprising the steps of:

(a) forming a lubricant solution by dissolving a functionalized fluorinated lubricant compound in a solvent, said compound containing at least one fluorinated alkyl chain, a functional group selected from an alcohol group (OH), carboxyl group (COOH) and phosphate group ($PO_4$), and said compound having a melting point above the ambient operating temperature of said magneto-optical disk and below about 85° C., and a viscosity in the range of about one hundred to about one thousand centipoises in the temperature range of about 60° to about 85° C.;
(b) coating the surface of the magneto-optical disk with said lubricant solution; and
(c) evaporating the solvent to produce a lubricant coating on the surface of a magneto-optical disk.

2. A method for providing a lubricant coating in accordance with claim 1 wherein the functionalized fluorinated lubricant compound comprises tris-perfluoroalkylcitrate.

3. A method for providing a lubricant coating in accordance with claim 2 wherein the solvent comprises perfluoroheptane.

4. A magneto-optical disk coated with a functionalized fluorinated lubricant coating formed by a method of claim 1.

5. A method for providing a lubricant coating on the surface of a magneto-optical disk, comprising the steps of:
(a) forming a lubricant solution by dissolving a functionalized fluorinated lubricant compound in a solvent, said compound being a compound represented by the structural formula:

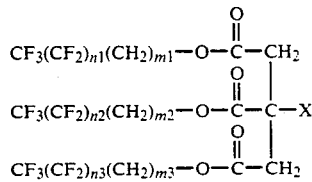

wherein n1, n2 and n3 are integers greater than or equal to eight, m1, m2, and m3 are integers from zero to three, and X is a functional group selected from an alcohol group (OH), carboxyl group (COOH) and phosphate group (PO$_4$), and said compound having a melting point above the ambient operating temperature of said magneto-optical disk and below about 85° C. and a viscosity in the range of about one hundred to about one thousand centipoises in the temperature range of about 60° to about 85° C.;
(b) coating the surface of the magneto-optical disk with said lubricant solution; and
(c) evaporating the solvent to produce a lubricant coating on the surface of a magneto-optical disk.

6. A method for providing a lubricant in accordance with claim 5 wherein the functionalized fluorinated lubricant compound comprises tris-perfluoroalkylcitrate.

7. A method for providing a lubricant in accordance with claim 6 wherein the solvent comprises perfluoroheptane.

8. A lubricant coating formed by the method for providing a lubricant coating on the surface of a magneto-optical disk, comprising the steps of:
(a) forming a lubricant solution by dissolving a functionalized fluorinated lubricant compound in a solvent, said compound containing at least one fluorinated alkyl chain, a functional group selected from an alcohol group (OH), carboxyl group (COOH) and phosphate group (PO$_4$), and said compound having a melting point above the ambient operating temperature of said magneto-optical disk and below about 85° C. and a viscosity in the range of about one hundred to about one thousand centipoises in the temperature range of about 60° to about 85° C.;
(b) coating the surface of the magneto-optical disk with said lubricant solution; and
(c) evaporating the solvent to produce a lubricant coating on the surface of a magneto-optical disk.

9. A lubricant coating formed by the method for providing a lubricant coating in accordance with claim 8 wherein the functionalized fluorinated lubricant compound comprises tris-perfluoroalkylcitrate.

10. A lubricant coating formed by the method for providing a lubricant coating in accordance with claim 9 wherein the solvent is perfluoroheptane.

11. A method for providing a functionalized fluorinated lubricant coating on the surface of a magneto-optical disk, comprising the steps of:
(a) forming a lubricant solution by dissolving tris-perfluoroalkylcitrate in perfluoroheptane to produce a solution of said compound;
(b) coating the solution on the surface of the magneto-optical disk; and
(c) evaporating the perfluoroheptane to produce a lubricant coating on the surface of a magneto-optical disk.

* * * * *